United States Patent [19]
Grönlund

[11] Patent Number: 5,992,550
[45] Date of Patent: Nov. 30, 1999

[54] DEVICE AND METHOD FOR SUSPENDING A TILTABLE ENGINE BONNET WITH RESPECT TO A VEHICLE FRAME

[75] Inventor: Mats Grönlund, Stockholm, Sweden

[73] Assignee: Scania CV AB, Sweden

[21] Appl. No.: 08/868,483

[22] Filed: Jun. 3, 1997

[30] Foreign Application Priority Data

| Jun. 7, 1996 | [SE] | Sweden | 9602206 |
| Jun. 7, 1996 | [SE] | Sweden | 9602295 |

[51] Int. Cl.⁶ .................................................. B62D 25/10
[52] U.S. Cl. ..................... 180/69.21; 180/89.17; 16/343; 267/260
[58] Field of Search ............... 180/69.2, 69.21, 180/89.17, 89.18; 16/343, 344, 345; 267/260

[56] References Cited

U.S. PATENT DOCUMENTS

| 2,520,921 | 9/1950 | Foster .............................................. 16/1 |
| 3,157,240 | 11/1964 | Chew ........................................... 180/69 |
| 4,186,657 | 2/1980 | Weil et al. . |
| 4,206,944 | 6/1980 | Kumagai et al. . |
| 4,776,626 | 10/1988 | Seyler . |
| 4,951,959 | 8/1990 | Watanabe et al. ...................... 280/96.1 |
| 4,991,675 | 2/1991 | Tosconi et al. ....................... 180/69.21 |

FOREIGN PATENT DOCUMENTS

| 0599997 | 11/1998 | European Pat. Off. . |
| 1313913 | 11/1962 | France ................................... 180/169 |
| 470352 | 1/1994 | Sweden . |
| 91/19071 | 12/1991 | WIPO . |

*Primary Examiner*—Paul N. Dickson
*Assistant Examiner*—Lynda Jasmin
*Attorney, Agent, or Firm*—Ostrolenk, Faber, Gerb & Soffen, LLP

[57] ABSTRACT

A bonnet or hood which is pivotable to open and closed conditions over a vehicle frame. A fastening portion fastenable to the vehicle frame, on which the bonnet is pivotable. A bent leaf spring rotatably connected between the fastening portion and the bonnet and urging the bonnet open. A slotted guide for controlling the extent of the opening of the bonnet. Elastic bushings at the various connections.

23 Claims, 4 Drawing Sheets

DEVICE AND METHOD FOR SUSPENDING A TILTABLE ENGINE BONNET WITH RESPECT TO A VEHICLE FRAME

BACKGROUND OF THE INVENTION

The invention refers to a device and a method for suspending an engine bonnet or hood with respect to a vehicle frame.

State of the Art

There are at present two types of heavy-duty truck bodies, namely the so-called cab-over-engine type, with the engine mostly arranged beneath a cab which is tiltable forwards, and the so called normal-bonneted or normal hood type, with the cab fastened to the frame and the engine mostly arranged in front of the cab in an engine compartment which is covered by an engine bonnet or hood. The bonnet of this latter type is often tiltable forwards about a transverse tilt spindle which is situated as far forward as possible in the vehicle and at the lower front edge of the bonnet. The bonnet is locked by a lock located at the rear edge of the bonnet. This lock is opened in the same manner as on passenger cars by means of an operating handle in the driver's compartment.

The bonnet or hood of a heavy-duty truck is large and heavy. It may weigh about 100 kg. It is therefore often connected to the frame by a spring with the object of making it easier to open. These springs are often in the form of pneumatic springs, coil springs, or the like.

The presence of these springs results in further torque being required at the time of fitting, since they have to be fastened in after the bonnet has been fitted to the frame, which usually takes place in the later stages of final assembly. By then, most components have already been fitted, which makes it difficult to reach the fastening points.

The presence of these springs also means that more components have to be accommodated in the engine compartment. The springs often occupy a large amount of space because they have to act in or close to a tangential direction with respect to the tilt spindle and be positioned relatively far away from the spindle with the object of being able to provide sufficient assistance to bonnet opening. Otherwise, the springs would have to be dimensioned larger in order to provide the same power assistance. This is a clear disadvantage because of the great difficulty in packing a large number of components into the engine compartment.

In such known arrangements, it is also advantageous to use some form of tilt stop device to prevent the bonnet from being tilted too far forwards, which might lead to damage to the bonnet or to other adjacent components, and to prevent its falling back from the open position, which might cause serious injuries, e.g. during servicing or other kinds of attention. Such a tilt stop device increases the above mentioned assembly and space shortage problems.

SUMMARY OF THE INVENTION

The object of the invention is to provide an inexpensive, robust, operationally reliable and space saving spring arrangement which makes possible a simple assembly method for suspending a tiltable bonnet with respect to a vehicle frame, and such a method.

Accordingly, the device according to the invention is distinguished by the presence of a leaf spring fastened in between the bonnet and the frame. This provides a solution which is compact and incorporates a small number of components which are all wear-resistant.

The device according to the invention is distinguished by the presence of a separate common fastening portion for fastening both the bonnet or hood and the spring pivotally to the frame according. This makes it possible to pre-assemble the spring to the bonnet, followed by fitting them to the frame as an integral unit during final assembly.

Mounting the bonnet with respect to the frame by means of an elastic bushing means that the bushing can be dimensioned to cope with rotation within the relevant tilting range, thereby eliminating the need for a separate bearing and consequently reducing the number of components. The bushing can also absorb the relative movements which may be applied to the bonnet by the cab if the latter is elastically suspended with respect to the frame.

A movement limiting device prevents the bonnet from pivoting too far forwards and prevents its falling back from the open position. The movement limiting device is fitted without adding further complicated assembly stages.

Use of a bent leaf spring enables the fastening or connection points for the spring to be placed close to the bonnet tilt spindle, thereby making it possible to use a relatively small fastening portion while at the same time making the arrangement more compact and space saving.

The bonnet may be supported by two substantially similar spring units each fixed to a respective longitudinal frame side member. This produces a stable arrangement with the constituent components arranged in positions which are advantageous from the space point of view.

The method according to the invention is distinguished by the fact that both the spring and the bonnet are fitted to a common fastening portion which is thereafter fixed to the frame. This makes it possible, as previously mentioned, to pre-assemble the spring to the bonnet, followed by fitting them to the frame as an integral unit during final assembly.

By first fitting the bonnet to the fastening portion before the spring is clamped in makes it possible to use an elastic bushing as described above, without a separate bearing, which bushing can then be fitted in the unloaded state before being made to rotate by the clamped-in spring.

Further features and advantages of the invention are indicated by the attached description of an embodiment which is described with reference to the attached drawings.

DESCRIPTION OF AN EMBODIMENT

This description mentions certain directional concepts. These relate to the vehicle when moving in its normal direction and to the bonnet when closed.

Figure 1:
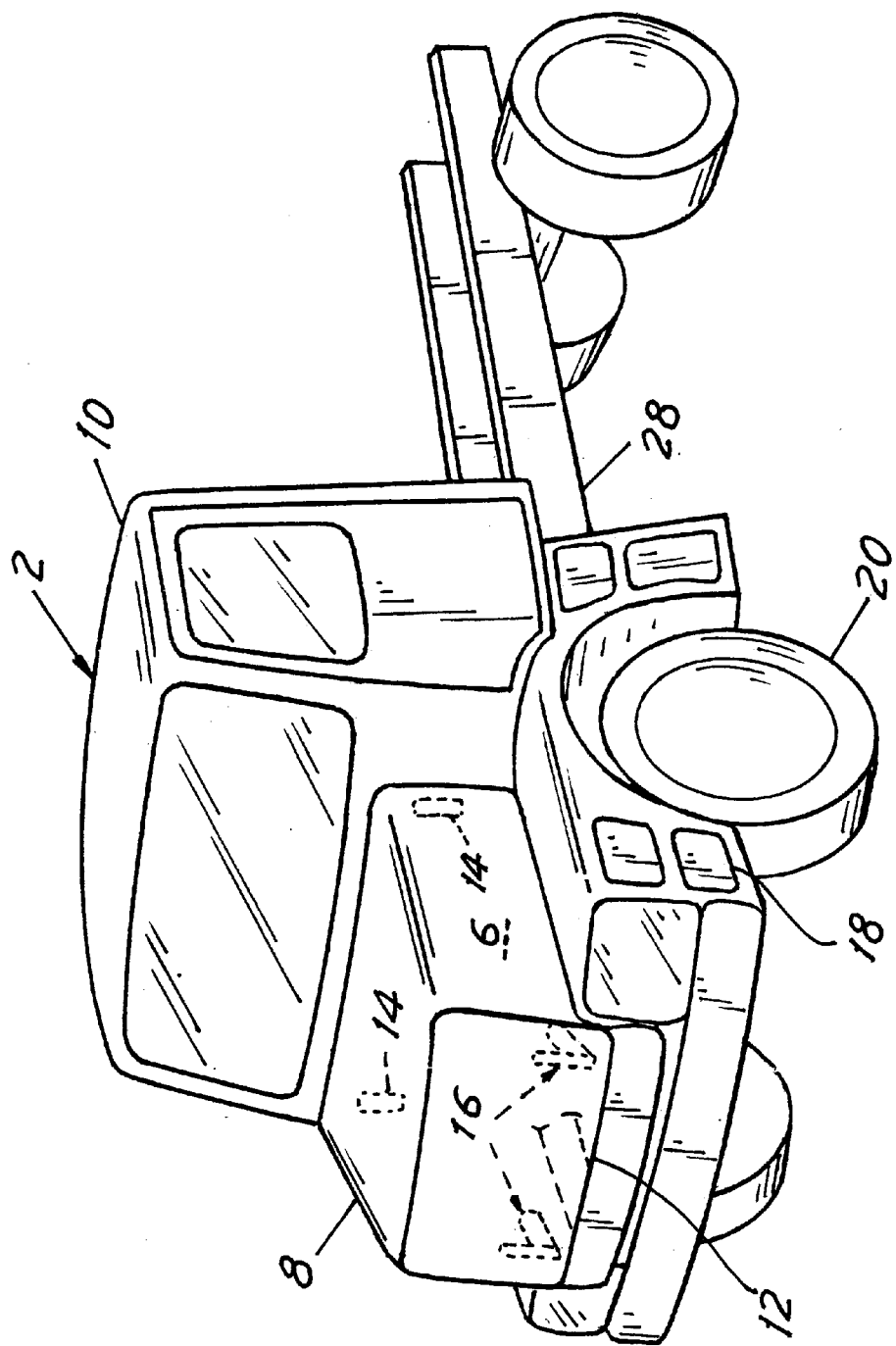
FIG. 1 shows a schematic view of a so-called normal-bonneted truck.

FIG. 1 shows a so-called normal-bonneted truck 2 which has its engine (not shown) arranged on a vehicle frame 4 within an engine compartment 6. The engine compartment 6 is covered by an engine bonnet or hood 8 which is tiltable forwards for providing access to components within the engine compartment 6 during servicing or other forms of attention. A driver's cab 10 is arranged on the vehicle frame 4 to the rear of the engine compartment 6 and of the engine bonnet 8. The driving cab 10 may be elastically suspended with respect to the frame at its rear edge and/or its front edge.

The engine bonnet 8 is arranged to be tiltable with respect to the frame 4 such that the bonnet tilts about a spindle extending substantially in the transverse direction of the vehicle and situated at the lower front edge 12 of the bonnet 8. The rear end of the bonnet is locked with respect to the cab 10 by two locks 14.

To allow the bonnet 8 to be tilted, the locks 14 can be opened by means of an operating handle (not shown) situated in the cab 10. Thereafter the bonnet 8 is tilted and pivoted forwards. To facilitate tilting, a spring arrangement 16 according to the invention is arranged between the bonnet 8 and the frame 4. The spring arrangement 16 is substantially symmetrical about a vertical plane extending in the longitudinal direction of the vehicle. To facilitate access to components within the engine compartment 6, a step 18 is provided in front of the front wheel 20.

The arrangement for suspending the spring and the bonnet according to the invention is described with reference to FIGS. 2–4, which show various stages of the assembly sequence. These drawings show only the left side mounting arrangement of the bonnet but, as previously mentioned, the arrangement is and analogous and substantially mirror image on the right side.

The components comprise the bonnet 8, a spring device 22, shown in the form of a leaf spring, a movement-limiting device 24, a fastening portion 26 and a frame element 28. The frame element 28 may comprise a longitudinal frame side member or, as shown, a bracket mounted on the frame. The bonnet 8 is mounted for rotation with respect to the fastening portion 26, while the free ends of the leaf spring 22 are mounted for rotation with respect both to the bonnet 8 and to the fastening portion 26. All relative rotation is about parallel spindles extending in the transverse direction of the vehicle. The fastening portion 26 is fixed to the frame 8. The movement-limiting device 24 prevents the bonnet 8 from being tipped too far and prevents its falling back from the open position.

The bonnet 8 is mounted with respect to the fastening portion 26 by means of a first elastic bushing 30, preferably made of rubber. The bushing 30 incorporates a central element 32 with cylindrical shell surface pressed into an outer sleeve 34 of the fastening portion 26, and two axially external and substantially circular discs 36 pressed in for associated rotation between the central element 32 of the bushing and two flanges 38 which form part of a bracket 40 fastened to the bonnet. This pressing in is by means of a central through-screw 42 with a cooperating nut 44. All relative movements which occur during tilting are thus absorbed as rotation in the bushing 30.

Figure 2:
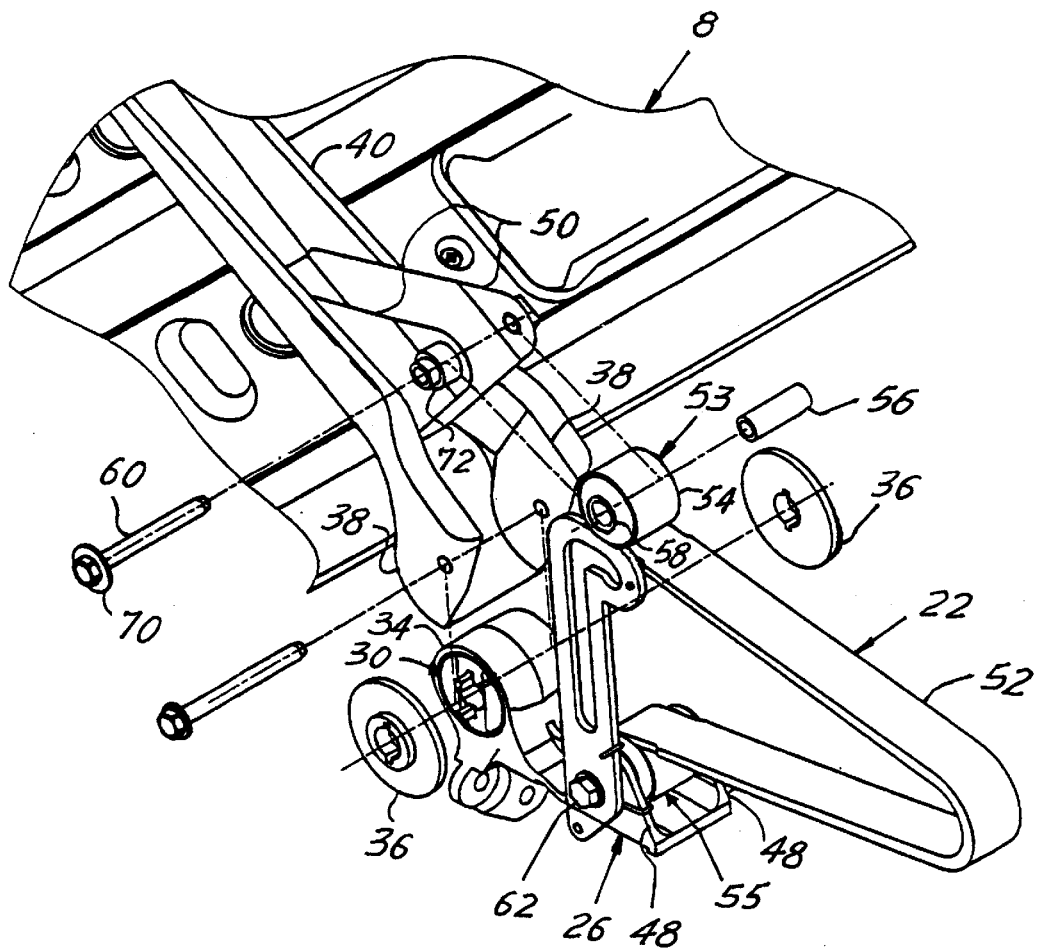
FIG. 2 shows a spring arrangement according to the invention and part of an engine bonnet before assembly.
Figure 3:
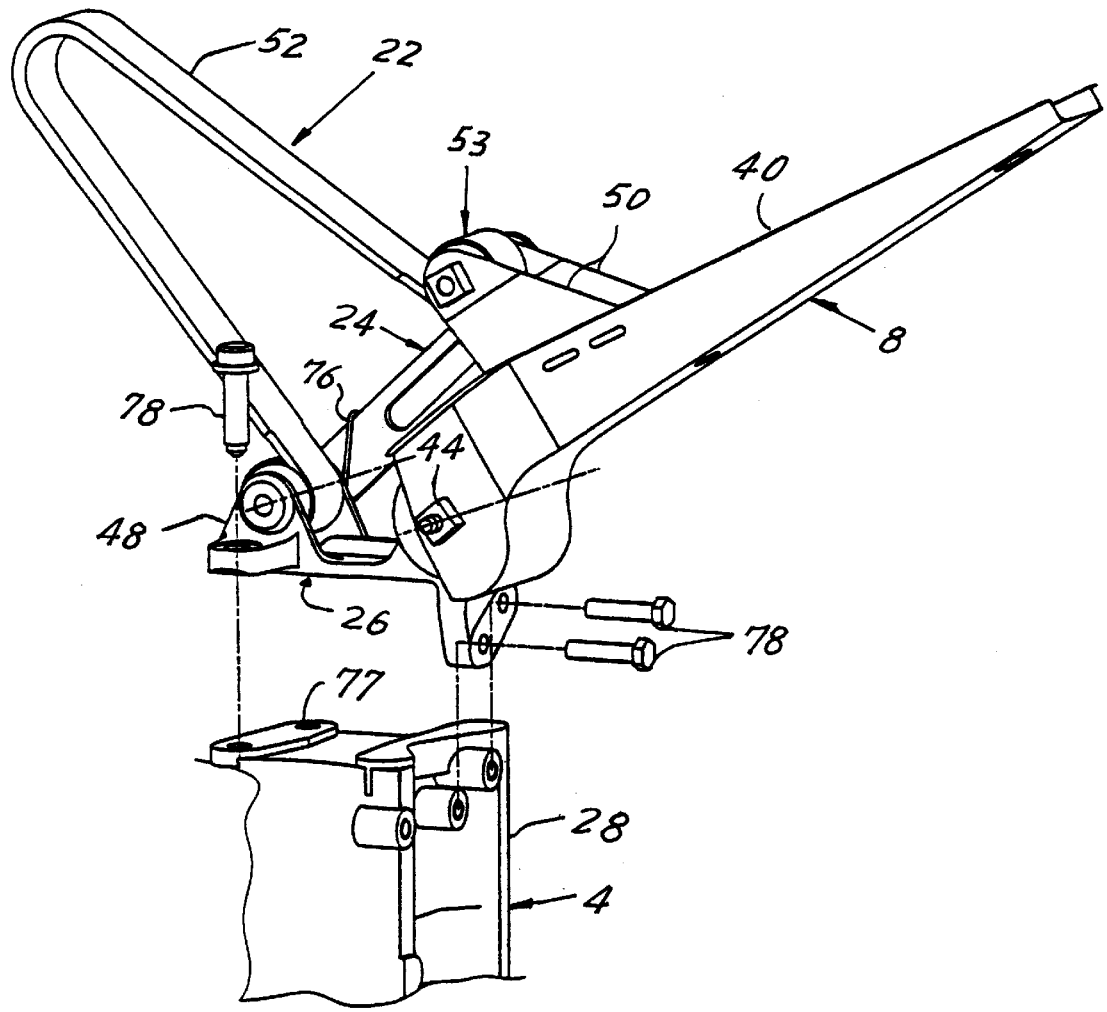
FIG. 3 shows the spring arrangement fitted to a bonnet section before fastening to the frame (for clarity, the bonnet is not depicted).
Figure 4:
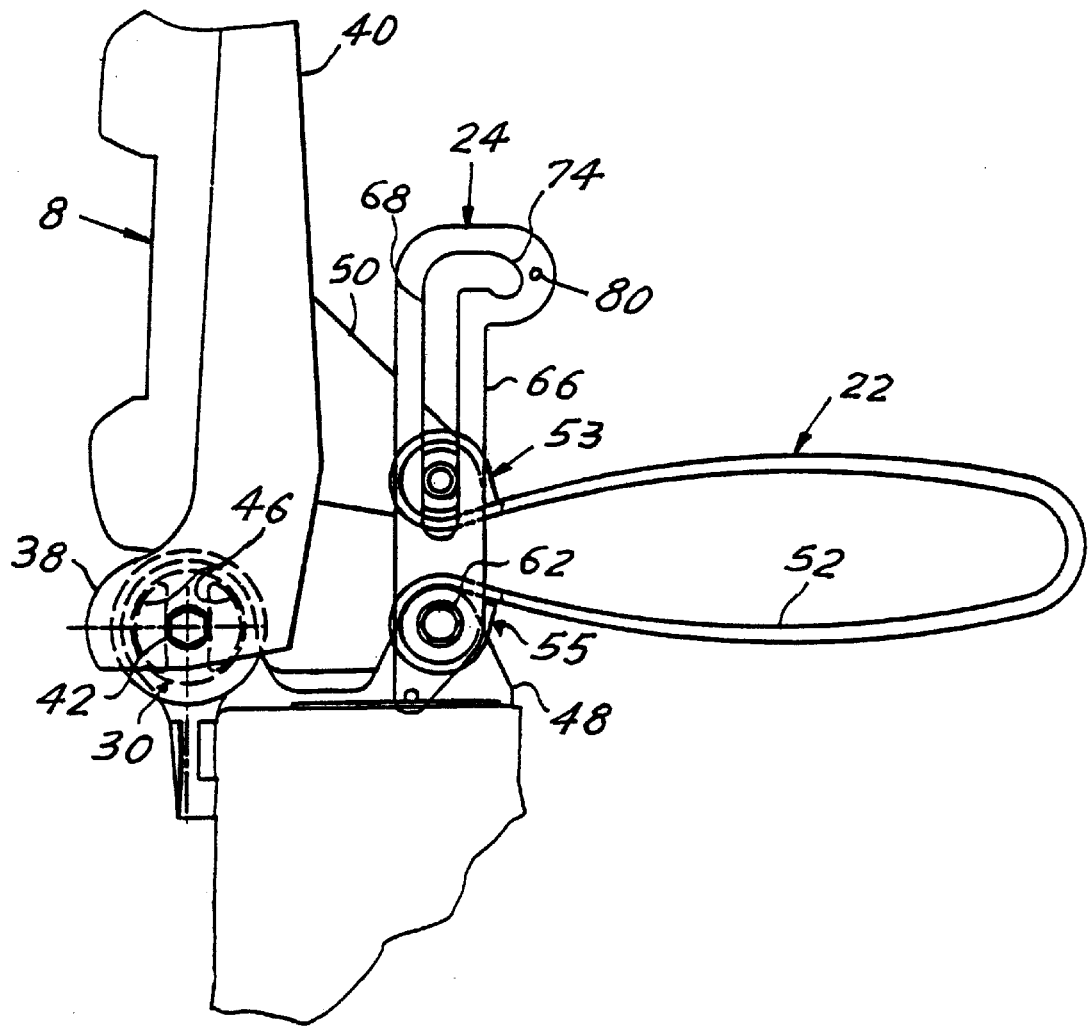
FIG. 4 shows a finally assembled bonnet incorporating the spring arrangement.

As indicated in FIGS. 2 and 4, the central element 32 of the bushing is provided with a cutaway area 46 which makes it weaker in the longitudinal and transverse directions than in the vertical direction. This is because the bushing 30 also has to be able to resiliently absorb movements in the longitudinal direction of the vehicle. Such resilient absorbable movements may be applied to the bonnet 8 from the rear in a vehicle with an elastically suspended driving cab 8.

The fastening portion 26 and the bonnet 8 are also connected to one another by the leaf spring 22 which is fastened for rotation with respect to the fastening portion 26 between two vertical flanges 48 arranged behind the first bushing 30 and is fastened in for rotation with respect to the bracket 40 which is fastened to the bonnet by means of two flanges 50 directed rearwards and arranged obliquely above the first bushing 30.

The leaf spring 22 incorporates a bent spring element 52 in the form of an iron bar directed rearwards and bent close to 180°, here depicted with a substantially rectangular cross-section. At the upper fastening point or end 53 of the spring element 52 there are an outer sleeve 54 and a concentrically arranged inner sleeve 56 between which an elastic bushing 58 preferably made of rubber is pushed in. The inner sleeve 56 is mounted with respect to the flanges 50 by means of an upper transverse pivot pin 60 in the form of a screw with a cooperating nut 64. The lower fastening point or end 55 of the spring element 52 is of analogous design with a lower transverse pivot pin 62 in the form of a screw with cooperating nut (not depicted) arranged with respect to the flanges 48.

The upper and lower bushings 58 are mounted freely with respect to the respective elements 48, 50 and are not arranged to absorb rotary movements. The sole purpose of the bushings 58 is to absorb movements caused by vibration during normal operation.

The movement-limiting device 24 incorporates a disc thin element 66 which has running through it an elongated slot-shaped hole 68. The element 66 is mounted for rotation with respect to the fastening portion 26 in such a way that the lower pivot pin 62 also extends through a second hole (not depicted) through the element 66. Thus both the lower end of the leaf spring 22 and the lower end of the element 66 are mounted with respect to the fastening portion 26 by means of the same pivot pin 62.

The upper pivot pin 60 in like manner passes through the elongated hole 68. Tilting the cab 10 along with the bonnet 8 thus makes the pivot pin 60 move along the slot shaped hole 68. The pivot pin 60 has a head 70, whose correct axial position is advantageously determined by a spacing sleeve 72 between the head 70 and the flange 50, which flange 50 is fastened to the bonnet.

When the bonnet is closed, the upper pivot pin 60 is thus in the lower part of the slot hole 68. When the bonnet is tilted, the pin 60 moves upwards in the slot hole 68 until it strikes the upper end of the slot.

This prevents the bonnet 8 from tilting further than this predetermined position.

The slot hole 68 is substantially L-shaped with a slot section 74 directed rearwards. When the upper pivot pin 60 is guided into this slot section 74, it locks the bonnet 8 in its tilted position and prevents the bonnet falling back. The slot section 74 thus defines a stop position for the pivot pin 60. It may also be advantageous to arrange a similar slot section directed rearwards at the lower end to make it possible to secure the bonnet closed, thereby preventing the bonnet 8 from opening while the vehicle is being operated, e.g. because the locks 14 become damaged by severe operating conditions.

A second spring device 76 causes rotation of the element 66 (anticlockwise according to FIGS. 2 and 4) so that the upper pivot pin 60 is automatically guided to the stop position 74. A mechanical control device (not shown), which is advantageously in the form of a wire arranged at a fastening point 80 of the element 66, is arranged to be able to cause rotation of the disc-shaped element 66 against the action of the second spring device 76 with the object of being able to release the pivot pin 60 from the stop position 74. This control device has to be readily accessible from outside the vehicle. For that purpose, the upper end of the wire may be arranged in the vicinity of the step 18 in front of the front wheel 20, advantageously in the engine compartment 6.

In an arrangement with safety devices, i.e., bent off slots at both end positions, the lower safety device may be designed to permit a certain tilt when the locks 14 are open, with the object of providing access to an operating handle situated in the engine compartment 6. Moreover, the arrangement with the L-shaped slot and the control device need only be provided at one of the two mounting points of the bonnet 8 on the frame 4.

In that case, the leaf spring 22 is arranged so as to be fastened in with preloading when the bonnet 8 is closed. For optimum functioning, the position of equilibrium of the spring 22 must be adopted when the bonnet is tilted further than its position of equilibrium, otherwise the spring will resist the opening of the bonnet. For maximum safety the leaf spring should always have a certain preloading or at least be so arranged as never to urge the bonnet towards the closed position with appreciable force. The preloading should nevertheless be such as to provide sufficient power assistance without appreciably hindering bonnet closure.

The procedure for fitting the bonnet 8 to the frame 4 is as follows:

The first stage is to press the central element 32 of the first bushing into the sleeve 34 of the fastening portion and to use the lower pivot pin 62 and its cooperating locknut (not depicted) to mount the lower fastening point or end 55 of the leaf spring and the lower end 24 of the movement-limiting device with respect to the fastening portion 26.

The second stage is to connect the bonnet 8 to the fastening portion 26. This is done by pressing the first bushing 30, including the discs 36, in between the flanges 38 and using the screw 40 and the nut 44 to secure it for associated rotation. At this stage it is important that the bonnet 8 and the fastening portion 26 should be positioned mutually according to FIG. 4, i.e. in the position where they are intended to be in the finally assembled state when the bonnet is closed. The reason for this is that the fact that the tilting movement is absorbed as rotation in the bushing 30 increases the latter's strength and service life if it is in its position of equilibrium during normal operation, i.e. with the bonnet closed, and this is achieved by assembly according to the procedure described.

The third stage is to mount the upper fastening point or end 53 of the leaf spring and the upper end 24 of the movement-limiting device with respect to the bracket 40 fastened to the bonnet, which is achieved by inserting the upper pivot pin 60 through the slot shaped hole 68 and the upper bushing 58 and securing it with the locknut 64 which cooperates with the pivot pin 60. The leaf spring 22 will thus urge the bonnet 8 towards the open position relative to the fastening portion 26.

The fourth stage is to apply the two fastening portions 26 to cooperating surfaces 77 of a respective longitudinal frame side member 28 and to secure each of them thereto by means of a respective threaded connection 78 which in this case incorporates three screws.

The result is a device which is robust and tolerant of vibration owing to the powerfully preloaded leaf spring. This arrangement is space-saving in that all the mounting points are close to one another. This also makes it possible subsequently to achieve a simple assembly method by means of pre-assembly to a relatively small fastening portion which can be fitted to the frame.

It may be advantageous to design this fastening portion so that a standardized frame can be used with a fixed element arranged to make it possible either, as here in the case of a normal-bonneted vehicle, to accommodate a fastening portion or, in the case of a cab over-engine vehicle, to accommodate a corresponding cab suspension arrangement.

A multiplicity of alternative embodiments may arise, e.g. the number of mounting points and corresponding leaf springs may be varied. The spring device may alternatively be comprised of a pneumatic spring, coil spring or the like, but the depicted embodiment with a bent leaf spring has advantages in providing a robust, tolerant and vibration-proof solution.

The mounting of the bonnet with respect to the fastening portion may also comprise an ordinary bearing or mounting if there is no need to absorb resilient movements. Conversely, the movement-limiting device may be mounted for movement with respect to the frame and for rotation with respect to the bonnet, or have a large number of alternative forms, e.g. a wire of predetermined length which somehow connects the bonnet to the frame.

With regard to the device according to the invention, there is no need for the bonnet, the leaf spring and the movement limiting device to be fixed to a fastening portion fastened to the frame. They may be fastened directly to the frame or to separate fastening portions fixed to the frame in a convention manner.

With regard to the assembly method according to the invention, the spring arrangement may first be mounted on a bracket which is thereafter fixed to the bonnet. Moreover, the above mentioned sequence of stages applies to the assembly of only one mounting point. The other mounting point may be assembled either simultaneously or sequentially but with the mutually same sequence of stages. What is important is first to fit the various springs and fastening portions to the bonnet to form a single integral subassembly to be secured subsequently to the frame.

The term "frame" also includes any fixed elements mounted on the frame. It may for example be advantageous for the fastening portion to be fixed to a basic bracket which is fastened to the frame and which includes fastening points for other items such as control gear, radiator or the like.

What is claimed is:

1. A device for suspending a tiltable engine bonnet or hood with respect to a vehicle frame on which the bonnet is supported, the device comprising:

a fastening portion fastenable on the frame;

a first connection on the fastening portion to which the bonnet is mounted to pivot between an open position permitting access to the engine and a closed position blocking such access;

the first connection comprises:

an elastic first bushing for mounting the bonnet for rotation with respect to the fastening portion, and a first spindle extending substantially transversely of the direction of the vehicle at the first bushing and enabling relative rotation of the bonnet with respect to the fastening portion at the first bushing and the first spindle;

a bent leaf spring having a second connection to the bonnet, which is separate from the first connection, and having a third connection to the fastening portion, which is separate from the first and the second connections, the leaf spring being preloaded when the bonnet is in the closed position;

respective first and second pivot pins at the respective second and third connections to the spring;

the second connection mounts the spring for rotation with respect to the bonnet, and the third connection mounts the spring for rotation with respect to the fastening portion.

2. The device of claim 1, further comprising a threaded connection between the fastening portion and the frame.

3. The device of claim 1, wherein the vehicle has a longitudinal direction and the first connection further comprises a spindle extending transversely of the longitudinal direction of the vehicle for mounting the spring rotatably with respect to the spindle.

4. The device of claim 1, further comprising
a second spindle extending substantially transverse of the longitudinal direction of the vehicle at the second connection for mounting the spring for rotation with respect to the second spindle and;
a third spindle extending substantially transverse of the longitudinal direction of the vehicle at the third connection for mounting the spring for rotation with respect to the third spindle.

5. The device of claim 1, further comprising a respective outer sleeve arranged at each of the second and third connections, a respective inner sleeve within each outer sleeve, and the respective first and second pivot pins being arranged in the respective inner sleeve; and
a respective elastic bushing pressed in between the respective outer and inner sleeves at both of the second and third connections.

6. The device of claim 5, further comprising a respective movement limiting device connected with at least one of the second and third connections of the spring for enabling the second and third connections to move together and apart as the bonnet pivots and for preventing movement of the second and third connections further apart than a predetermined distance.

7. The device of claim 6, where the movement limiting device comprises a guide element having an elongated slot therein, the guide element being mounted for rotation with respect to the fastening portion;
the first pivot pin, which is at the second connection of the spring to the bonnet, being guided along the slot for being movable therealong, the slot in the guide element being shaped to include a stop position therein for the first pivot pin as it is guided along the slot.

8. The device of claim 7, further comprising a second spring for rotating the movement limiting device away from the second pivot pin at the first connection for causing the first pivot pin to reach the stop position;
a mechanical control device for causing rotation of the movement limiting device toward the first pivot pin for shifting the first pin away from the stop position.

9. The device of claim 8, wherein the mechanical control device is positioned at the outside of the vehicle and/or is the type to be accessible from outside the vehicle.

10. The device of claim 7, wherein there are two respective sets of the fastening portions, of the first and the second springs, of the guide elements and of the second and third connections, the sets being separated across the width of the vehicle;
the frame having respective side members which are symmetrical with respect to a vertical plane of symmetry through the middle of the vehicle and a respective one of the sets being located at each of the side members.

11. The device of claim 1, wherein there are two respective sets of the springs and of the fastening portions across the width of the vehicle;
the frame having respective side members which are symmetrical with respect to a vertical plane of symmetry through the middle of the vehicle and a respective one of the sets being located at each of the side members.

12. A method for suspending a pivotable engine bonnet with respect to a vehicle frame, the method comprising:
fitting a fastening portion to the bonnet at a first connection such that the bonnet is pivotable with respect to the fastening portion;
connecting a leaf spring which has ends by connecting one end of the spring at a second connection to the bonnet and connecting another end of the spring at a third connection to the fastening portion for enabling the bonnet to pivot to different positions with respect to the fastening portion, wherein the spring acts in opposition to the pivoting of the bonnet to the closed position of the bonnet over the vehicle frame;
wherein the connecting is done in the sequence after connecting the spring to the fastening portion at the third connection, then connecting the fastening portion to the bonnet at the first connection, and then connecting the spring to the bonnet at the second connection;
the spring is fitted for rotation at the second and the third connections with respect to both the bonnet and the fastening portion whereby the spring permits the bonnet to rotate to different positions with reference to the fastening portion; and
thereafter attaching the fastening portion to the vehicle frame.

13. The method of claim 12, wherein the connecting to of the third connection of the spring to the fastening portion further comprises fitting a movement limiting device to the fastening portion, the movement limiting device being rotatable with respect to the fastening portion at the time the third connection of the spring to the fastening portion is made, and fitting the movement limiting device so that it is mounted for movement with respect to the second connection for the spring.

14. The method of claim 12, wherein there are two of the springs spaced apart across the width of the vehicle, and two of the fastening portions at the same spaced apart locations and each fitted to the bonnet, wherein each of the springs has respective second and third connections which are connected to the bonnet and the fastening portion, respectively, for permitting relative rotation between the bonnet and the fastening portions, and after such fitting, fixing the fastener sections to the frame.

15. A device for suspending a tiltable engine bonnet with respect to a vehicle frame, wherein a vehicle has a longitudinal direction and the bonnet is supported to the frame to pivot between an open position permitting access to the engine and a closed position blocking such access, the device comprising:
a bent leaf spring between the bonnet and the frame, the spring having a first end mounted for rotation with respect to the frame and a second end mounted for rotation with respect to the bonnet, the spring being of a type to be fastened in with pre-loading when the bonnet is in the closed position and being positioned to urge the bonnet to divot to the open position; a respective first and second pivot pin extending substantially transverse to the longitudinal direction of the vehicle at each of the first and second ends of the leaf spring and on which the ends of the leaf spring are mounted for pivoting respectively with respect to the bonnet and the frame.

16. The device of claim 15, further comprising an outer sleeve around each of the first and second pivot pins, an inner sleeve within each outer sleeve, and the respective pivot pin extending through the inner sleeve; and an elastic bushing between the outer and the inner sleeves.

17. The device of claim 15, further comprising a movement limiting device acting on at least one end of the leaf spring for preventing the ends thereof from moving further than a predetermined distance relative to one another.

18. The device of claim 17, wherein the movement limiting device comprises a guide element having an elongated slot therein, and the first pivot pin for first end of the spring being positioned to move along the slot.

19. The device of claim 18, wherein the first pivot pin in the slot is the pivot pin attached to the bonnet.

20. A device for suspending a tiltable engine bonnet with respect to a vehicle frame, wherein the bonnet is supported to the frame to pivot between an open position permitting access to the engine and a closed position blocking such access, the device comprising:
- a bent leaf spring between the bonnet and the frame, the spring having a first end mounted for rotation with respect to the frame and a second end mounted for rotation with respect to the bonnet, the spring being of a type to be fastened in with pre-loading when the bonnet is in the closed position and being positioned to urge the bonnet to pivot to the open position;
- the movement limiting device acting on at least one end of the leaf spring for preventing the ends thereof from moving further than a predetermined distance relative to one another;
- the movement limiting device comprises a guide element having an elongated slot therein, and one of the pivot pins for one end of the spring being positioned to move along the slot, the slot includes at least one stop position for the first pivot pin;
- a second spring device for causing rotation of the movement limiting device away from the first pivot pin for causing the first pin to engage at the stop position;
- a mechanical control device for rotating the movement limiting device toward the first pivot pin for shifting the first pivot pin from the stop position, freeing the first pivot pin to move with respect to the second pivot pin.

21. The device of claim 20, wherein the bonnet and the first leaf spring end are both mounted for rotation with respect to the frame, and a common fastening portion for the bonnet and the first leaf spring end.

22. The device of claim 20, further comprising an elastic bushing mounting the bonnet to the frame for enabling pivoting of the bonnet with respect to the frame.

23. The device of claim 20, further comprising two of the leaf springs spaced apart transversely across the frame, a respective longitudinal frame side member also spaced apart across the frame, each spring being connected between the bonnet and the respective frame side member, such that there is a plane of symmetry in the vertical direction that passes through the middle of the vehicle in its longitudinal direction between the leaf springs.

\* \* \* \* \*